March 27, 1928.
W. E. GOSSLING
1,663,698
SPACING AND SUPPORTING BRIDGE FOR STORAGE BATTERY PLATES
Filed Sept. 5, 1923 2 Sheets-Sheet 1
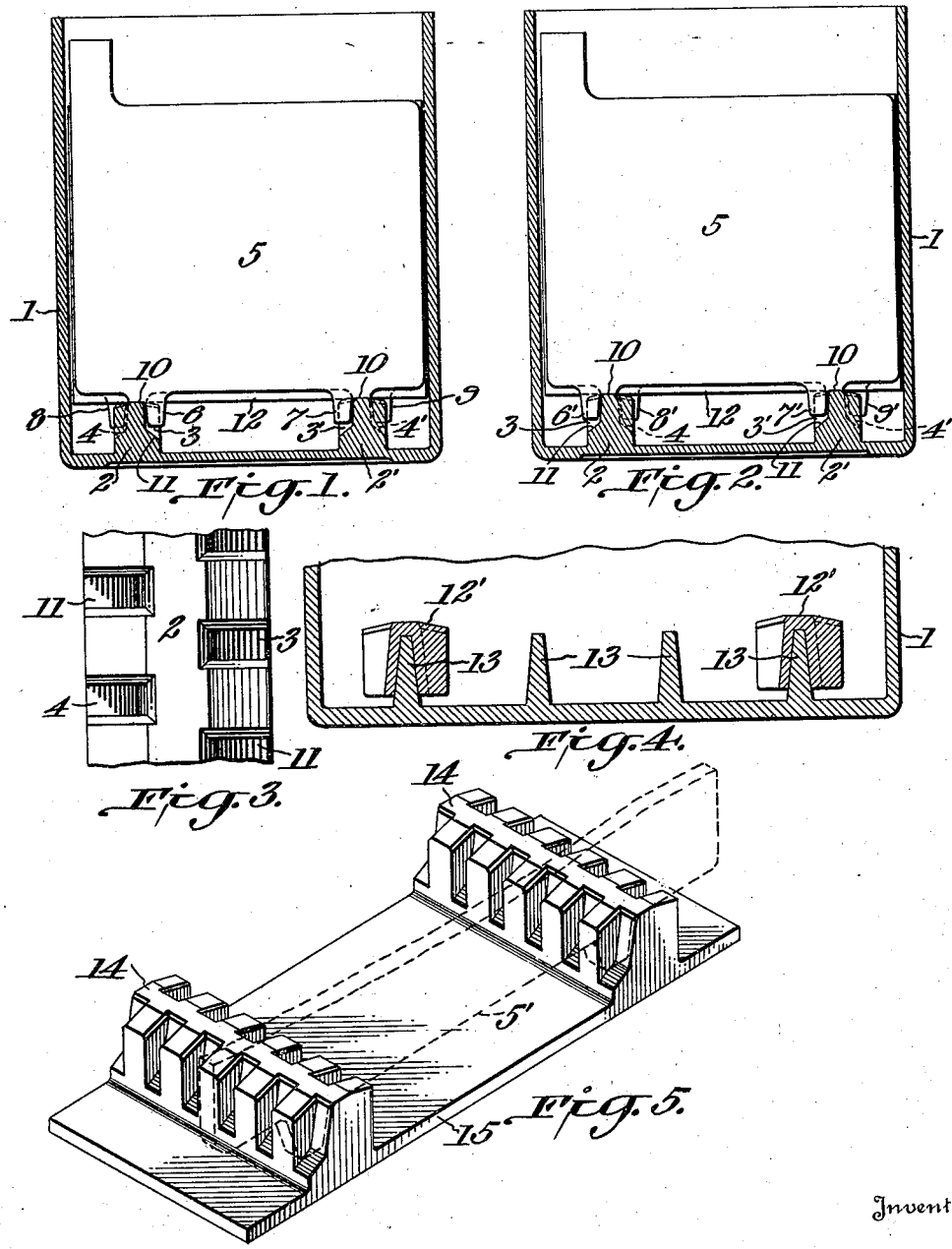
Inventor:
Walter E. Gossling,
By Byrnes, Townsend & Brickenstein,
Attorneys.

March 27, 1928.  1,663,698
W. E. GOSSLING
SPACING AND SUPPORTING BRIDGE FOR STORAGE BATTERY PLATES
Filed Sept. 5, 1923  2 Sheets-Sheet 2
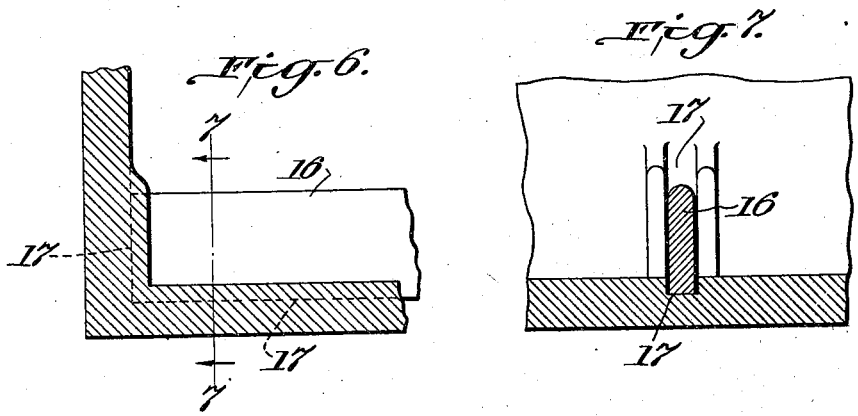
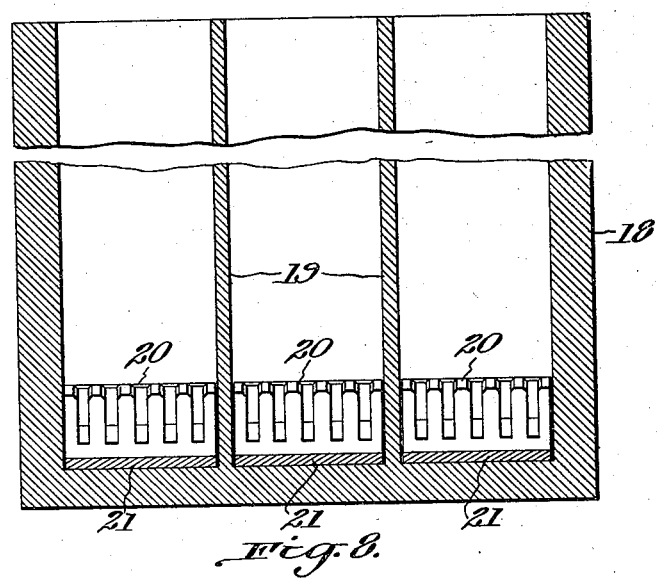
Inventor:
Walter E. Gossling,
By Byrnes, Townsend & Brickenstein
Attorneys.

Patented Mar. 27, 1928.

1,663,698

UNITED STATES PATENT OFFICE.

WALTER E. GOSSLING, OF INDIANAPOLIS, INDIANA, ASSIGNOR, BY MESNE ASSIGNMENTS, TO PREST-O-LITE STORAGE BATTERY CORPORATION, A CORPORATION OF INDIANA.

SPACING AND SUPPORTING BRIDGE FOR STORAGE-BATTERY PLATES.

Application filed September 5, 1923. Serial No. 661,105.

This invention relates to improvements in electrode-supporting bridges of the type customarily provided on the bottom of certain forms of storage battery containers. A particular object of the invention is to provide a supporting bridge adapted to space the electrodes and to hold them in proper position.

Means for elevating the battery elements above the bottom of the container is ordinarily essential, in order to provide space beneath them for active material which may be dislodged from the electrode plates during operation of the battery. The dislodged material would otherwise be likely to form short-circuiting deposits between adjacent plates of opposite polarity, especially by passing through or beneath the separators spacing the plates. A number of bridge constructions have heretofore been suggested. Ordinarily they do not comprise means for holding the individual electrodes in spaced relation to each other, but merely elevate them above the container bottom. The most practical of these constructions include depending portions or feet on the plates cooperating with the bridges. The feet on the positive and the negative plates usually lie respectively on opposite sides of the bridges, so that sloughed active material, collecting in the compartments formed by the bridges, can connect only plates of the same polarity.

The present supporting bridge and cooperating plate structure is of the general type described, but is characterized by certain improvements and advantages, particularly with regard to the spacing of the plates, as will appear from the following description, taken in connection with the accompanying drawing, in which Fig. 1 is a vertical section through a battery jar provided with the novel plate-spacing bridge;

Fig. 2 is a similar view, showing a modification in the arrangement of the plates;

Fig. 3 is a plan view of a portion of the bridge;

Fig. 4 is a partial vertical section through a battery jar showing a modification of the spacing bridge adapted to rest upon a supporting rib of ordinary type;

Fig. 5 is a perspective view of a removable bridge adapted to be placed on the plane bottom of a container, the lower portion of a plate being shown in dotted outline;

Fig. 6 is a partial vertical section through a container having means to receive a removable bridge of another type;

Fig. 7 is a transverse section on line 7—7, Fig. 6; and

Fig. 8 is a vertical section through a container having compartments and removable bridges in each.

Referring to Figs. 1 and 3, numeral 1 denotes a battery jar or container of any suitable type, having plate-supporting bridges 2 and 2′ therein. The bridges are provided with rows of recesses 3 and 4, 3′ and 4′, respectively, arranged in staggered relation on opposite sides of each bridge. Recesses 3 and 4 in bridge 2 are in alinement with those of corresponding number in bridge 2′.

The electrode plates 5, of which only one is shown in entirety, are provided with feet 6 and 7, 8 and 9. All the positive plates have feet lying on the outside only of the bridges and all the negatives have feet lying on the inside only, or vice versa, for the reason previously stated. These feet are shaped and positioned so as to be received somewhat loosely in the recesses in the bridges. The plates 5 are provided with seats 10 adapted to rest upon the bridge tops.

I prefer to make the tops relatively wide, so that there will be no probability of injury by penetration or crushing at the point of contact. Cutting of the bridge into the plate, or of the plate into the bridge, has been a disadvantage in certain prior constructions using narrow bridges. However, to avoid possible short-circuiting by collection of active material on the tops of the bridges, where it may pass under or through the separator into contact with adjacent plates of opposite polarity, the breadth of the horizontal portion of the bridges is limited. A downward slope, as at 11, is given the bridge surface on each side of the part sustaining the plates, so that sloughed active material will not collect on such surface in objectionable amounts.

The lower margin of the plates 5 may be higher than seats 10, as illustrated, so that the separators 12, of which only one is shown, extend beneath the margin throughout the greater portion of its length. In this way short-circuiting between the bottoms of adjacent plates, by crystal growth or the like, is substantially avoided. Plates 5' (Fig. 5), having a straight lower margin resting directly upon the bridges, may also be used.

In the constructions described, the plates are positively prevented from lateral shifting, by engagement of the feet with the recesses. Also, the plates are at all times held in properly spaced relation to each other. This latter is an important and distinctive feature of the present invention. It results in minimizing the compression of the separators between the plates, owing to buckling of the plates or other causes, which would frequently result in failure of the separators and formation of destructive short-circuits.

The form of the invention shown in Fig. 2 is like that of Fig. 1, except that in the former the feet 6' and 7', 8' and 9', are not symmetrically placed on the bridges. As shown, feet 6', 9', lie within recesses opening toward the wall of the jar, while feet 7', 8', on the corresponding plates, are placed in recesses opening toward the interior. Since feet 7' and 8' occupy positions on opposite sides of the large central space, no difficulty will be encountered because of the collection of deposits of active material, although the feet are part of electrodes of opposite polarity. The principal advantage of this construction is that the same form of grid is used for both positive and negative plates. The separator and plate assembly should be fitted somewhat snugly into the container, to prevent lateral movement.

While it is generally desirable to make the bridges integral with the container, they may be made separately and placed in the jar, with securing means if necessary. In Fig. 4 supplemental bridges 12', recessed in accordance with my invention, are placed upon bridges 13 of conventional type. The advantages of the present invention may be obtained in jars of prior types by applying the improved bridge in the manner illustrated.

The construction illustrated in Fig. 5 is advantageous for use with battery containers having plane bottoms. This construction comprises two or more bridges 14 formed upon a base 15 of suitable dimensions for insertion in the container. While in removable supports of this type spacing bridges made according to the present invention are preferred, other types of bridges may be substituted. Since deterioration of the bridges often makes it necessary to discard containers otherwise in good order, a replaceable bridge structure of the type described is obviously desirable.

Figs. 6 and 7 show another form of removable support (16) adapted to rest in grooves 17 in the ends and bottom of the container. The support 16 is illustrated as a strip of suitable width having a rounded top. The shape of the support may be varied and plate-spacing means provided on it, if desired.

The form of the invention shown in Fig. 8 comprises a container 18 having walls 19 dividing it into battery-receiving compartments, each provided with removable bridges 20, preferably formed integrally with base plates 21 or so attached to them as to form a unit. This type of container is generally a unitary structure formed of hard rubber or other suitable material and takes the place of a wooden casing containing a number of separate battery jars. Heretofore it has been the practice to form supporting bridges integrally with the bottoms of the compartments. In motor vehicle batteries and the like the bridges are ordinarily the first part of such containers to fail, as they are subject to the cutting and abrading action of the heavy plates, which unavoidably shift to some extent under the influence of vibration. By providing replaceable bridges the service life of the average container is much prolonged.

The bridges 20 may be merely set in the desired position or may be received in grooves or held by other means.

Hard rubber is generally to be preferred as the material of the improved bridges, but other strong, acid-resistant materials may be used. The number of bridges and other details of construction may be varied in accordance with the requirements of diverse battery practice.

I claim:

1. A plate spacing and supporting bridge for storage batteries, provided with a plate-supporting surface and a plurality of recesses at each side of said surface adapted to hold the plates in spaced relation at their bottoms.

2. A plate spacing and supporting bridge for storage batteries, provided with a top supporting surface and lateral recesses on opposite sides of said surface adapted to receive portions of the plates and hold them in spaced relation at their bottoms, said bridge being recessed to receive a bottom rib of a battery container.

3. A narrow plate-spacing attachment for storage battery containers having plate-supporting ribs, comprising a member having recesses in its sides adapted to receive portions of the plates and a recess at right angles to said first named recesses adapted to receive a container rib.

4. A plate spacing and supporting bridge for storage batteries, comprising two rows of recesses arranged one on each side of the bridge and adapted respectively to receive portions of plates of opposite polarity, the recesses in one row being in staggered relation to those in the other.

5. In a storage battery, plates provided with downwardly extending portions, and a bridge having alined rows of lateral recesses adapted to receive said portions and prevent movement of the bottoms of said plates lengthwise of said bridge, said bridge also having a plate-supporting surface of sufficient width substantially to prevent penetration at the point of support.

6. In a storage battery, plate spacing and supporting bridges comprising two rows of recesses arranged one on each side of each bridge, the recesses in the rows on each bridge being in staggered relation to each other, and corresponding pairs of recesses on the several bridges being in alinement, and negative and positive plates having extended portions adapted to fit into alined pairs of recesses.

7. The invention according to claim 6, in which the extended portions of the plates of one polarity lie on the exterior of the bridges, while such portions on the plates of opposite polarity lie within the bridges, whereby lateral shifting of the plates is prevented.

8. In a storage battery, plates each having at its bottom margin seat portions lying below the greater portion of that margin, bridges having surfaces adapted to receive said seats, and a foot on each of said plates extending downwardly with respect to and on one side only of each said seat, said bridges having means cooperating with such feet to space the bottoms of said plates.

9. In a storage battery, plates each having at its bottom margin seat portions lying below the greater portion of that margin, feet on the plates extending downwardly with respect to the seats, bridges having surfaces adapted to receive said seats and recesses for the feet, and plate separators resting upon the bridges with their lower margins in substantial alinement with the seats.

10. A plate spacing and supporting bridge for storage batteries, provided with a plate-supporting surface and a plurality of recesses at each side of said surface, the recesses on opposite sides being in staggered relationship.

In testimony whereof, I affix my signature.

WALTER E. GOSSLING.